United States Patent [19]

Shimizu et al.

[11] Patent Number: 4,991,037
[45] Date of Patent: Feb. 5, 1991

[54] APPARATUS FOR MANIPULATING A MAGNETIC TAPE CARTRIDGE AND THE MAGNETIC TAPE CONTAINED THEREWITHIN

[75] Inventors: Munetaka Shimizu; Ryoichi Umezawa, both of Tokyo, Japan

[73] Assignee: Copal Co., Ltd., Tokyo, Japan

[21] Appl. No.: 339,904

[22] Filed: Apr. 17, 1989

Related U.S. Application Data

[63] Continuation of Ser. No. 27,616, Mar. 18, 1987, abandoned.

[30] Foreign Application Priority Data

| Mar. 26, 1986 | [JP] | Japan | 61-67598 |
| Mar. 28, 1986 | [JP] | Japan | 61-68548 |
| Mar. 28, 1986 | [JP] | Japan | 61-68549 |
| Mar. 28, 1986 | [JP] | Japan | 61-68550 |
| Mar. 28, 1986 | [JP] | Japan | 61-68551 |
| Mar. 28, 1986 | [JP] | Japan | 61-68552 |

[51] Int. Cl.$^5$ ............................................. G11B 15/67
[52] U.S. Cl. ............................................. 360/71; 360/95
[58] Field of Search ................... 360/71, 95; 242/195, 242/76

[56] References Cited

U.S. PATENT DOCUMENTS

| 4,608,614 | 8/1986 | Rinkleib | 360/95 |
| 4,611,251 | 9/1986 | Yokoo | 360/95 |
| 4,685,009 | 8/1987 | Min et al. | 360/95 |
| 4,734,800 | 3/1988 | Suzuki | 360/95 |
| 4,787,570 | 11/1988 | Nakagome | 360/95 |
| 4,832,284 | 5/1989 | Inoue | 360/95 |

Primary Examiner—Robert S. Tupper

[57] ABSTRACT

A tape drive of the type for withdrawing a magnetic tape together with a leader block connected to the leading end thereof out of a tape cartridge so as to record and reproduce the information onto or off of said magnetic tape. In addition to driving sources for driving a supply reel disposed in the tape cartridge and a take-up reel, a single power source is provided for accomplishing the opening or closing of a door of the housing, the vertical movement of the housing, the displacement of the leader block and the pushing or ejection of the tape cartridge out of the housing.

3 Claims, 12 Drawing Sheets

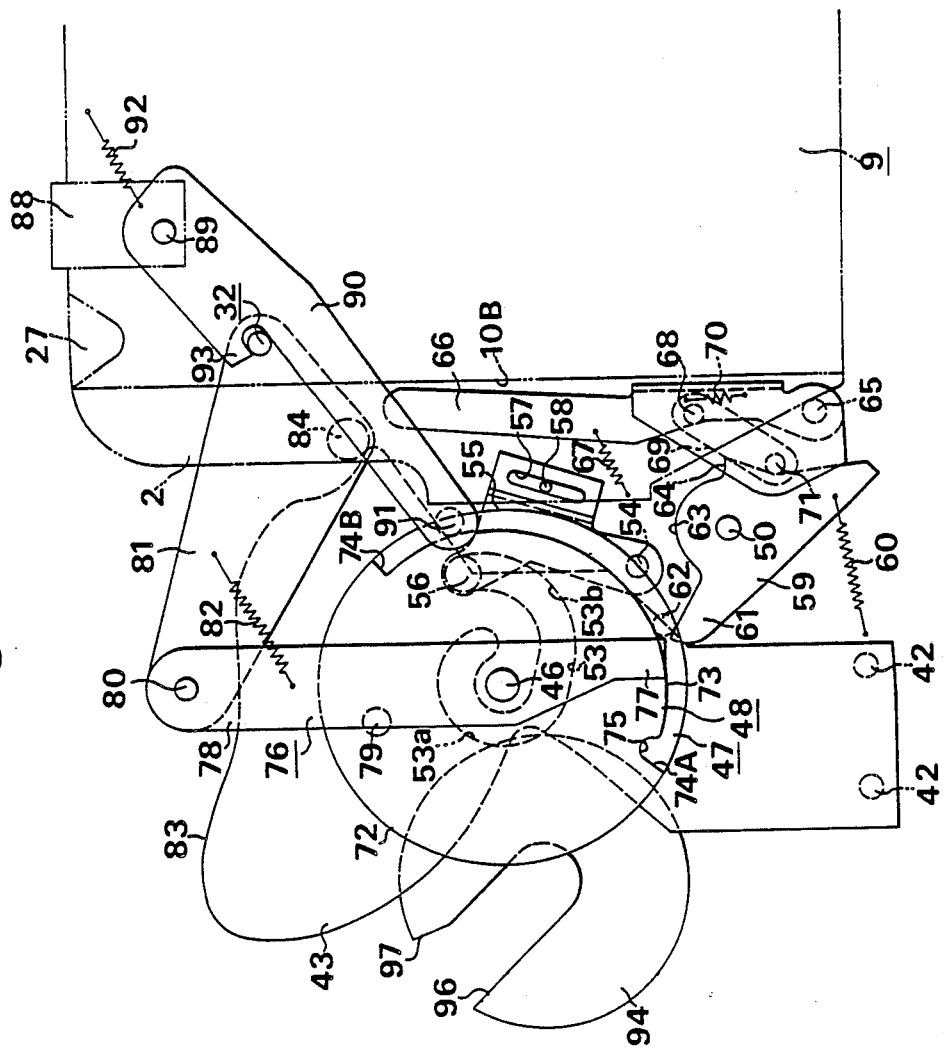

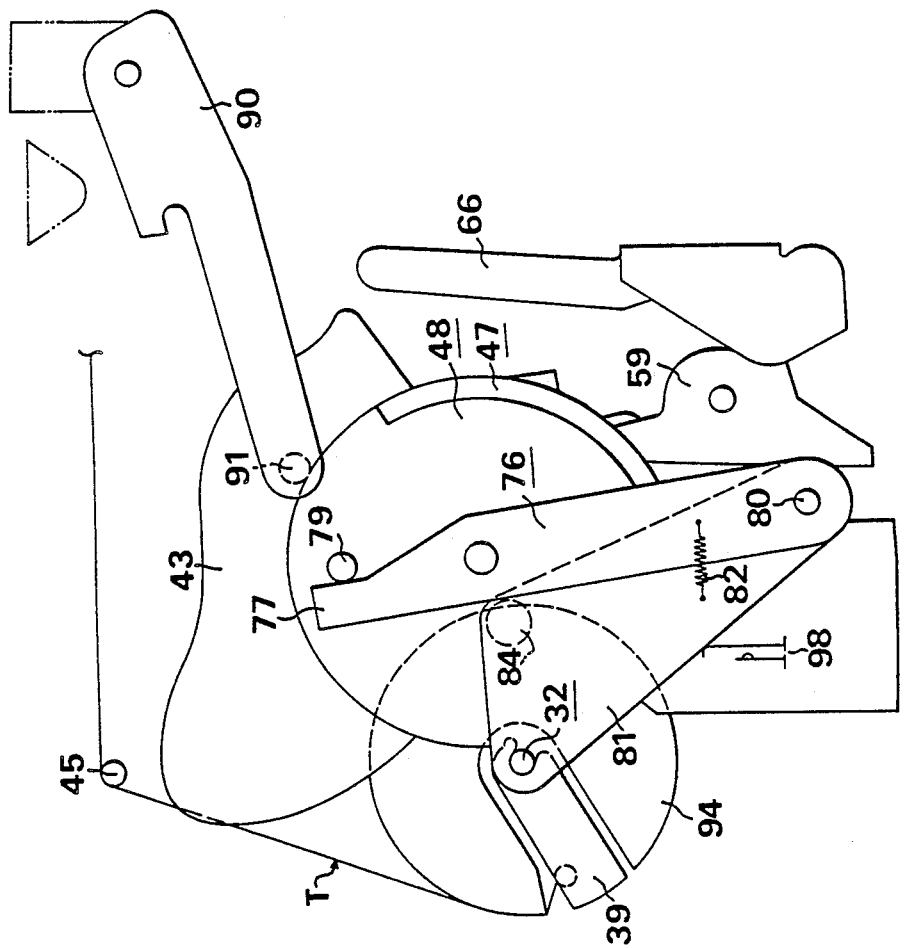

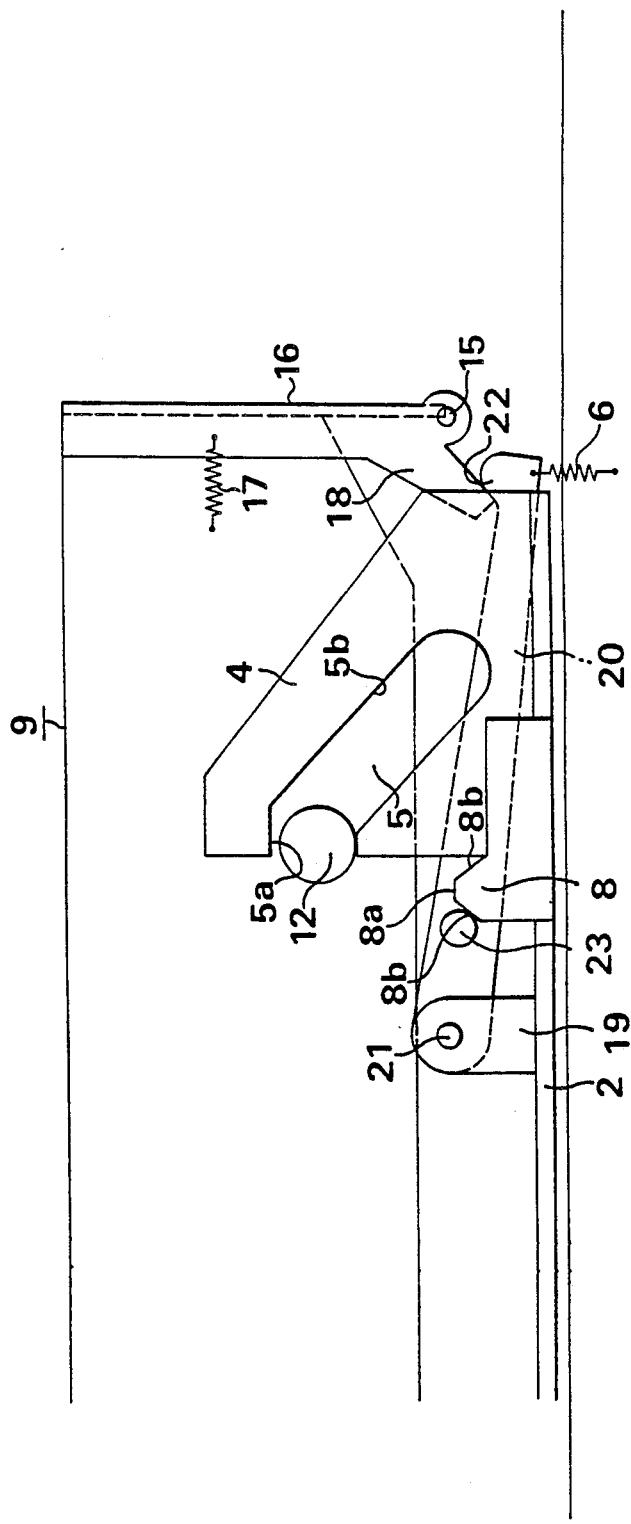

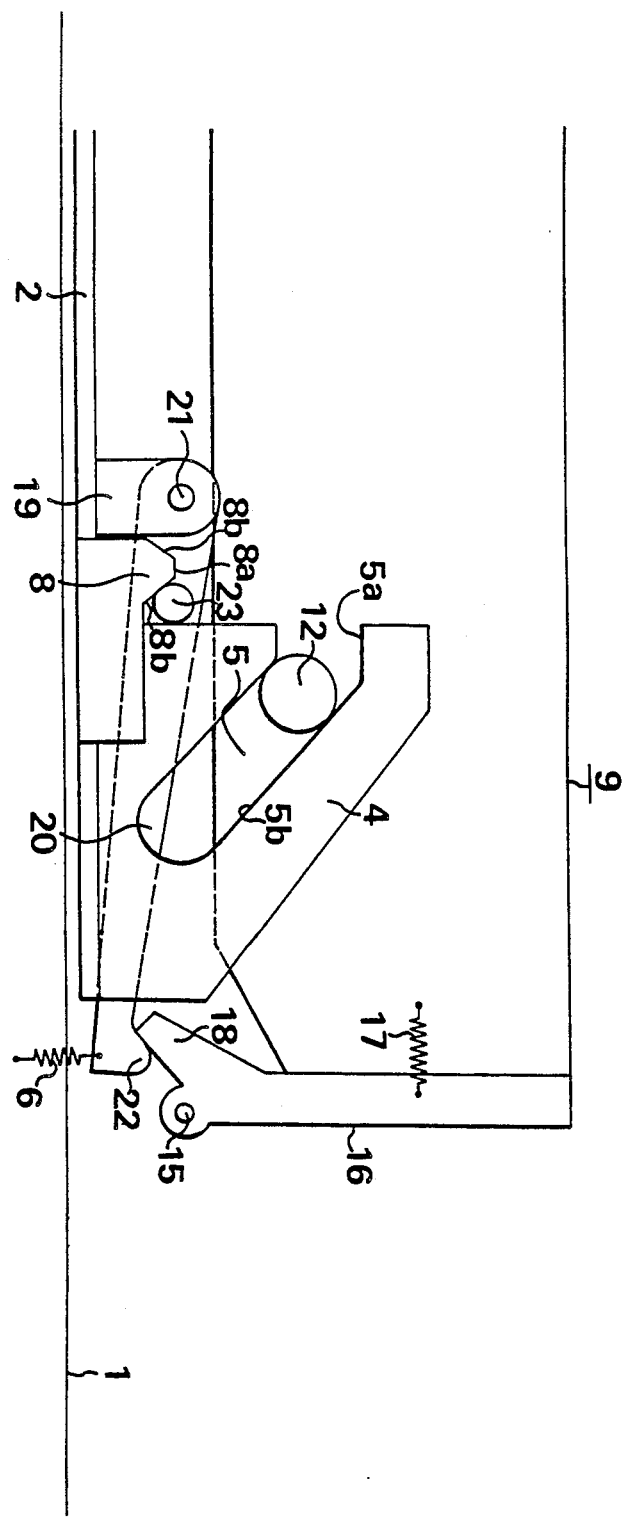

APPARATUS FOR MANIPULATING A MAGNETIC TAPE CARTRIDGE AND THE MAGNETIC TAPE CONTAINED THEREWITHIN

This application is a continuation of application Ser. No. 027,616, filed Mar. 18, 1987, now abandoned.

FIELD OF THE INVENTION

The present invention relates to a tape drive which is adapted to be used is a backup for small-sized magnetic disks and which uses, as a recording media, a magnetic tape cartridge which is simple in handling and has a relatively high recording capacity so that information is written on and read out from the magnetic tape in the cartridge.

BACKGROUND OF THE INVENTION

Magnetic tapes have been long well known in the art of recording as media for recording information. Especially as exterior main recording devices for large-sized high-speed computers or backup storage devices for magnetic disks used in the computers of the type described above, storage media of the type in which a long length of multi-track tape is wound around a tape reel have been well known and are used even at the present. However, it is relatively complicated to mount such magnetic tape wound around a tape reel having a large diameter to load on a storage device and such storage device itself becomes large in size. In addition, the magnetic tape which is loaded in a tape reel case when the magnetic tape is carried or handled is relatively large in size and is not easy to carry it. Furthermore, the tape is unroled when it is unloaded from the case so that it is not easy to handle it. On the other hand, in order to enhance the handling of the magnetic tape, tape cartridges and tape cassettes have been already devised and mainly used in audio equipment, VTRs and so on. The magnetic tapes loaded into the tape cartridges are wider than those loaded in the tape cassettes so that the former have a high storage capacity and consequently are adapted for use as information storage media for computers.

Of such tape cartridges, the tape cartridges of the type in which an endless magnetic tape is loaded and transported within the cartridge and which are adapted to be used in conjunction with the conventional audio equipment are mainly used. Such magnetic tape cartridges are easy in handling, but have a low degree of dust-proof capability because a portion of the magnetic tape is normally exposed the front surface of the cartridge. Furthermore, there are fears that the tapes are damaged by careless handling, contaminants are adhered to the tape from the fingers and the information stored on the exposed portion of the magnetic tape is lost. Therefore, they are not adapted for use in the computers in which the stored information must be maintained at a high degree of reliability. Furthermore, they have a defect that since an endless magnetic tape is transported within the cartridge, the tape transportation speed cannot be increased beyond a certain limit.

In order to solve the above-described problems and defects, a tape cartridge of the type adapted to record and read out the information by drawing the magnetic tape having the ends out of the cartridge was devised and is disclosed in U.S. Pat. No. 4426047. In this tape cartridge, a leader block is attached to the leading end of the magnetic tape and the magnetic tape is drawn out of the cartridge by drawing out of the leader block and then is made into contact with the head so that the information can be recorded in 18-24 tracks in the widewise direction of the magnetic tape. The magnetic tape loaded in such tape cartridge has a storage capacity of the order of 100-300 mega bytes per cartridge. The magnetic media can be easily handled and carried and the storage devices can be made compact in size. Therefore, they are best adapted for use as backup files of small-sized hard magnetic disks or floppy disks and are expected to be further utilized advantageously.

Meanwhile, the tape drives for recording information by using such tape cartridges have been devised and demonstrated. Such tape drives must have the functions of loading the tape cartridge, drawing and withdrawing the leader block from and into the cartridge, permitting the free transportation of the magnetic tape between the take-up reel and the cartridge and so on.

However, in the conventional tape drives of the type described above, the relationship among driving mechanisms which are used to accomplish the above-described various functions is complicated. Especially when it is desired to automatically control a plurality of driving mechanisms, driving means such as a motor must be provided for each driving mechanism so that the whole construction becomes large in size and furthermore a special control mechanism for causing a plurality of driving means to coact with other is needed. As a result, the assembly and control become complicated or inconvenient and the fabrication cost is increased.

BRIEF SUMMARY OF THE INVENTION

In view of the above, a first object of the present invention is to provide a tape drive which can overcome the above and other problems encountered in the prior art tape drives and uses a minimum number of driving means in order to cause the vertical movement of a housing so as to record and read out information, to draw the leader block out of the tape cartridge and to ensure the stable transportation of magnetic tape.

A second object of the present invention is to provide a tape drive in which the opening and closing of the housing in which is loaded a tape cartridge and the vertical movement of the housing can be accomplished only at a predetermined timing in a stable manner.

To attain the above objects, the present invention comprises a driving source, a transmission mechanism which is caused to reciprocate by the driving source so as to cause the vertical movement of a housing, a driving arm which is moved by the driving source so as to cause the transportation of a leader block, a stationary cam for causing the driving arm to move along a predetermined passage between a tape cartridge and a take-up reel and an eject lever which is rotated by the driving source so as to push the tape cartridge out of the housing.

According to the construction described above, except a driving source for rotating a tape reel within the tape cartridge and another driving source for rotating an exterior take-up reel, only one driving source is provided in order to accomplish the various functions described above. As a result, required operations can be carried out in a stable manner with a few driving source and the tape drive can be made compact in size.

Furthermore, in accordance with the present invention, a loading-unloading lever which is adapted to revolve around the cam is made into engagement with a driving arm holder which in turn is made into engagement with the leader block and the rotating moment of the loading-unloading lever is increased by utilizing the principle of a lever so that the drawing and the insertion from and into the tape cartridge can be accomplished by a great force in a stable manner.

Moreover, according to the present invention, when the magnetic tape is unrolled from the exterior take-up reel and is rewound around the tape reel in the tape cartridge, a switch is turned on in response to the movement of the leader block at the leading end of the magnetic tape in an insertion groove of the take-up reel so that the trailing end of the magnetic tape is detected. Therefore, as compared with the conventional method in which the trailing end of the magnetic tape is detected by measuring the length thereof, the tape end can be detected in a simple manner. Furthermore, the tape end can be correctly detected without being adversely affected by the elongation of the magnetic tape.

In addition, according to the present invention, a door of the housing is opened or closed immediately after the start of operation by the driving source through the transmission mechanism so that the operation for opening or closing the door is enhanced, the dust-proof capability can be ensured when the tape drive is in the de-energized mode and the intentional insertion of foreign matter into the housing can be prevented.

In addition, according to the present invention, there is provided a sensor for detecting the insertion of a tape cartridge into the housing and only after the detection of the tape cartridge by this sensor, the housing is moved downwardly by the driving source so that there is no fear at all that erratic operations occur.

DESCRIPTION OF THE PREFERRED EMBODIMENT

Figure 1:
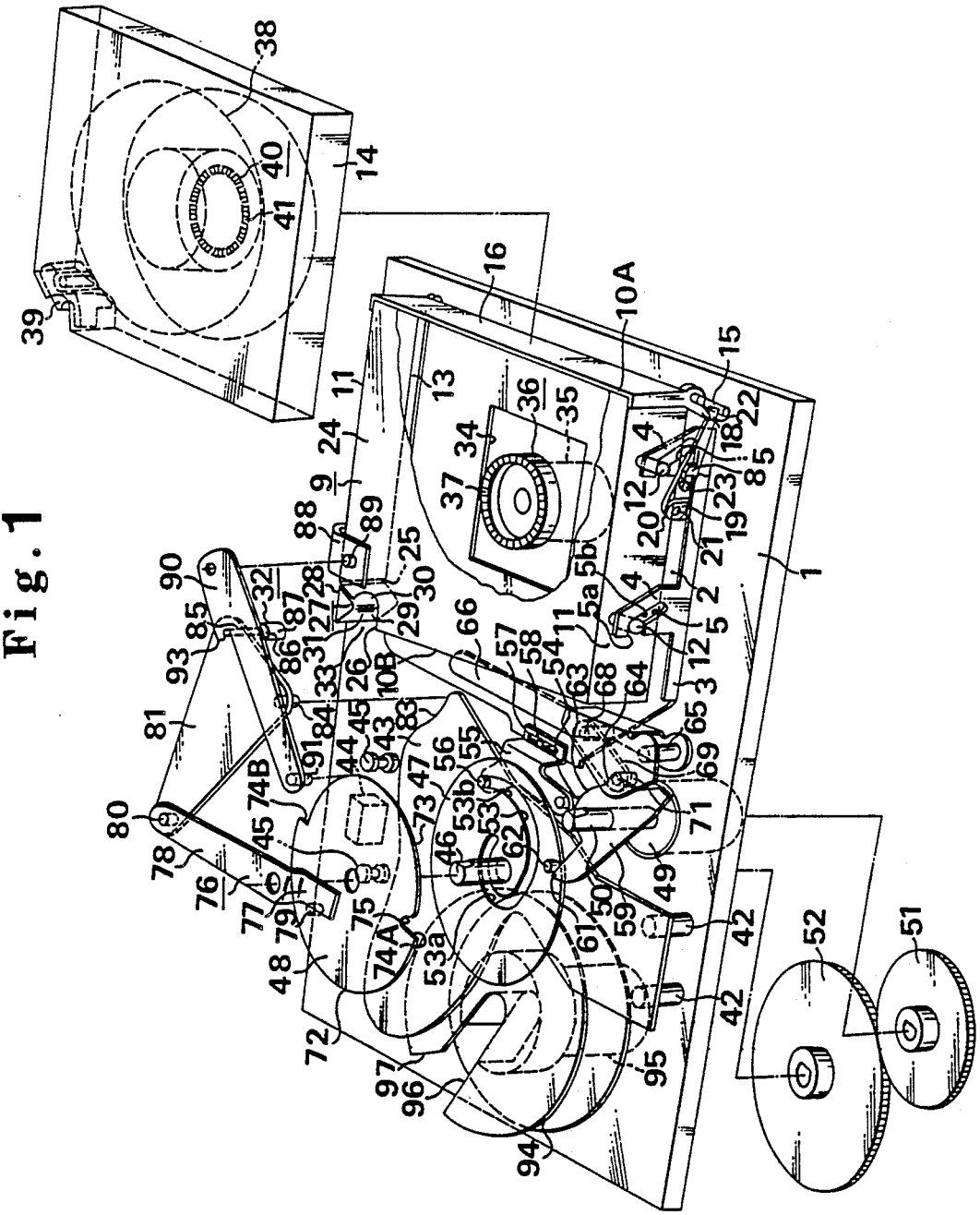
FIG. 1 is an exploded perspective view of a preferred embodiment of a tape drive in accordance with the present invention.
Figure 3:
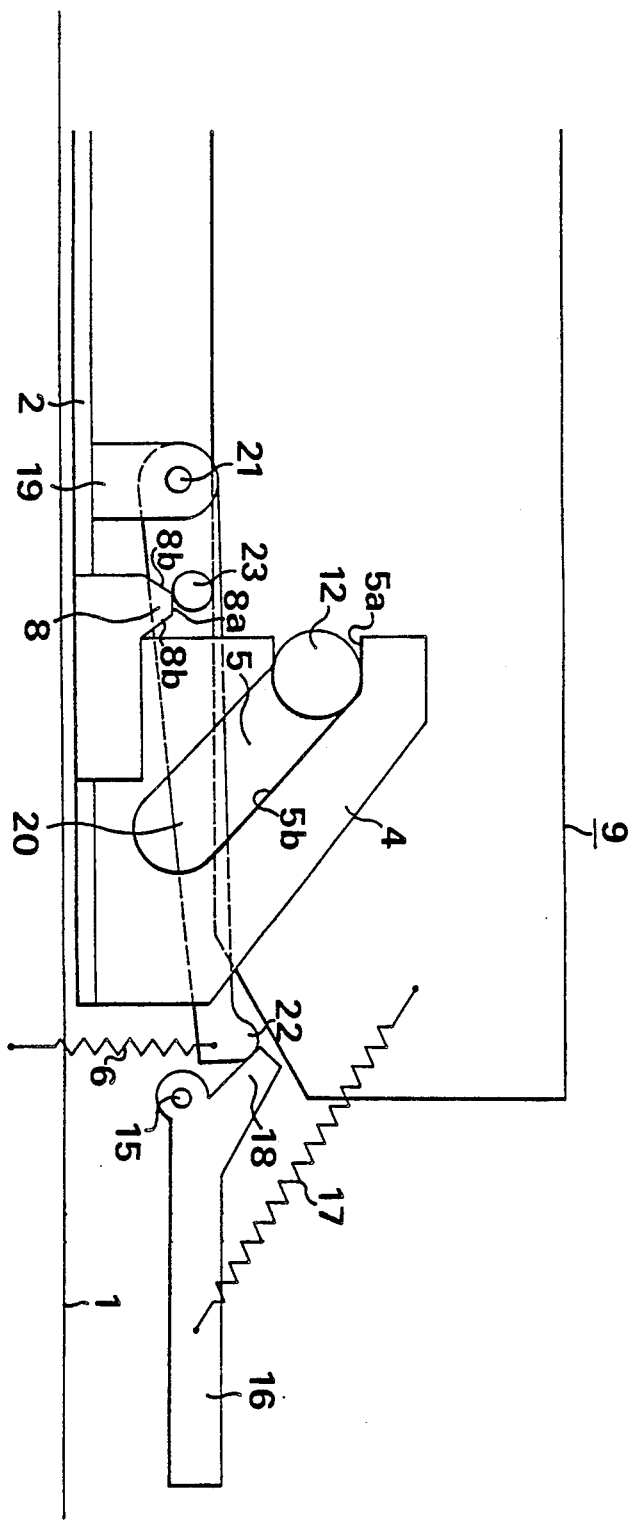
FIGS. 3A, B and C are side views used to explain the mode of operation of the tape drive shown in FIG. 1.

FIG. 1 is an exploded perspective view illustrating the whole construction of tape drive in accordance with the present invention. A housing driving plate 2 is made into contact with a base plate 1 at one end portion thereof in such a way that the housing driving plate 2 can slide over the base plate 1 and elongated straight upright members 3 (only one is shown) are disposed in parallel with each other on the opposing sides of the housing driving plate 2. A pair of guide plates 4 which are similar in shape are extended upwardly from each upright member 3, spaced apart from each other by a suitable distance in the horizontal direction and formed with guide grooves 5, respectively, which are similar in shape and directed in the same direction. Each guide groove 5 comprises a horizontal groove 5a which is exposed to the exterior and is defined at the upper end of the guide groove 5 and an inclined groove 5b extended obliquely downwardly from the inner end of the horizontal groove 5a. As best shown in FIG. 3, the horizontal groove 5a is extremely short in length. An upwardly extended mountain-shaped cam 8 is attached at one side of the upright member 3 at the leading end portion thereof. The cam 8 comprises a flat top portion 8a and a pair of inclined portions 8b extended downwardly from both ends of the top portion 8a, respectively as best shown in FIG. 3A.

A housing 9 whose bottom is opened and which has a substantially U-shaped cross sectional configuration and whose top is substantially square is disposed above the housing driving plate in such a way that openings 10A and 10B at both ends of the housing are located in the longitudinal direction of the base plate 1. A pair of pins 12 are extended from both of the opposing side walls of the housing 9 (only one side wall 11 is shown) and are spaced apart from each other by a suitable distance in the horizontal direction. The distance between a pair of pins is equal to the distance between the guide plates 4 of the upright member 3. The pins 12 of the housing 9 are fitted into the guide grooves 5 of the guide plates 4, respectively, and guide means (not shown) are provided so that only the vertical movement of the housing 9 is permitted. Therefore, in response to the displacement of the housing driving plate 2 in the longitudinal direction of the base plate 1, the housing 9 is vertically moved while the pins 12 thereof slide through the guide grooves 5 of the guide plates 4. It should be noted that even at the lowest position, the housing 9 is out of contact with the housing driving plate 2.

A supporting member 13 is extended horizontally inwardly from the lower side of each side wall 11 of the housing 9 which is substantially similar in shape to a tape cartridge 14. Both ends of the tape cartridge 14 are supported by the inwardly extended supporting members 13, whereby it is maintained in the housing 9. A pivot pin 15 is extended from the lower portion of the front end of each side wall 11, supported by a front decoration plate (not shown) with an opening which is securely disposed at the front end of the base plate 1 and carries rotatably a door 16. The opening 10A through which is inserted the tape cartridge 14 into the housing 9 is closed or opened by the door 16. In this embodiment, the door 16 is pivoted to the base plate 1, but it may be pivoted with the pivot pins 15 to the lower portions at the front ends of the side walls 11 of the housing 9.

The door 16 is biased by a bias spring 17 shown in FIG. 3A in the counterclockwise direction in FIG. 1; that is, in the direction in which the door 16 closes the opening 10A. An obliquely downwardly extended arm 18 is projected from the lower end of each end of the door 16. A portion adjacent to one of the upright members 3 of the housing driving plate 2 is formed with an opening (not shown) and a bracket 19 is extended upright in opposed relationship with this opening. This opening is large in size and is defined around the bracket 19 so that the latter will not interrupt the movement of the housing driving plate 2. A lever 20 which is extended in the direction of the arm 18 is pivotably attached with a pivot pin 21 to the bracket 19 and a hook 22 for engagement with the leading end of the arm 18 is formed at the leading end of the lever 20 The lever 20 is biased in the clockwise direction in FIG. 1 under the force of a bias spring 6 shown in FIG. 3A. A pin 23 is extended from the midpoint between the ends of the lever 20 for engagement with the cam 8 and as the housing driving plate 2 is displaced, the lever 20 is caused to rotate about the pivot pin 21 since the height of the cam 8 made into contact with the pin 23 varies.

Notches 25 and 26 are formed at the rear corners, respectively, of one side wall 11 of the housing 9 and the top plate 24 and a guide post 27 is uprightly disposed on the base plate 1 within these notches 25 and 26. The guide post 27 has a flat side wall 28 substantially in coplaner relationship with said one side wall 11. Two guide surfaces 29 and 30 are extended from the side surface 28 into the housing 9 in such a way that the upper sides of the sides surfaces 28, 29 and 30 define an equilateral triangle in a plane with the upper one side of the side surface 28 being the base. The guide surfaces 29 and 30 merge with each other through a curved surface 31. The notch 26 in front of the guide post 27 is defined as a receiving portion 33 into which is inserted a holding pin 32 to be described below.

A substantially rectangular opening 34 is formed through the housing driving plate 2 art the center portion thereof and a transverse plane gear (an end-face gear in the form of a crown gear) 36 which is driven by a motor 35 mounted on the base plate 1 is disposed in the opening 34.

Teeth 37 are defined in the form of a ring at the upper end of the gear 36 and are located above the housing driving plate 2. The opening 34 is defined considerably larger than the gear 36 so that the latter will not interrupt the displacement of the housing plate 2.

The tape cartridge 14 which is inserted through the opening 10A into the housing 9 incorporates a length of tape wound around a tape reel 38 disposed in the cartridge 14 and a leader block 39 is attached to the leading end of the tape and is removably attached to the corner of the tape cartridge 14 so that the leader block 39 withdraws the tape out of the tape cartridge 14 to the exterior. When the tape cartridge 14 is inserted into the housing 9, the leading end of the leader block 39 is in opposed relationship with the receiving portion 33. Furthermore, transverse plane gear 40 which has teeth 41 directed downwardly is carried by the tape reel 38 and when the gear 40 is made in mesh with the gear 36, the rotating force of the motor 35 is transmitted to the tape reel 38.

A flat stationary cam 43 to be described in more detail below is supported by a plurality of posts 42 extending from the base plate 1 and is located behind the housing 9. A magnetic head 44 for writing and reading out the information onto and off of the magnetic tape is disposed on the base plate 1 at one side of the stationary cam and at a position of the extension of the receiving portion 33 of the housing 9. Guide pins 45 are uprightly extended from the base plate 1 on both side of the magnetic head 44.

A rotating shaft 46 is rotatably mounted on the stationary cam 43 through a bearing (not shown) and a first disk 47 and a second disk 48 are securely fitted over the rotating shaft 46 for rotation in unison therewith. A motor 49 is suspended from the base plate 1 adjacent to the stationary cam 43 and the rotating shaft 50 of the motor 49 is upwardly extended in parallel with the rotating shaft 46. A spur gear 51 carried by the output shaft 50 is in mesh with a spur gear 52 carried by the rotating shaft 46 so that the rotating force of the motor 49 is slightly reduced and then transmitted to the first and second disk 47 and 48.

The first disk 47 is formed with a cam groove substantially in the form of a spiral. As best shown in FIG. 2A, the cam groove 53 consists of an escape groove 53a defined at the center portion of the first disk 47 substantially coaxially thereof substantially through 270° and a driving groove 53b which is communicated with the end of the escape groove 53a in the counterclockwise direction and is gradually increased in diameter also in the counterclockwise direction. A lever 55 which rotates about a pivot pin 54 extended uprightly from the base plate substantially in the direction of the displacement of the housing driving plate 2 is disposed adjacent to the output shaft 50 and has a pin 56 extended from the leading end thereof and fitted into the cam groove 53 of the first disk 47. The lever 55 is formed with an elongated groove 57 extended in the direction substantially perpendicular to the direction of the displacement of the housing driving plate 2 and a pin 58 extended uprightly from the base end portion of the housing driving plate 2 is fitted into this elongated groove 57. Therefore, when the motor 49 is energized so that the first disk 47 is rotated, the pin 56 of the lever 55 is caused to move through the driving groove 53b of the cam groove 53 in the radial direction so that the housing driving plate 2 is displaced in the longitudinal direction of the base plate 1. When the pin 56 moves into the escape or relief groove 53a of the cam groove 53, the displacement of the housing driving plate 2 is stopped even when the first disk 47 continues to rotate.

Figure 2:
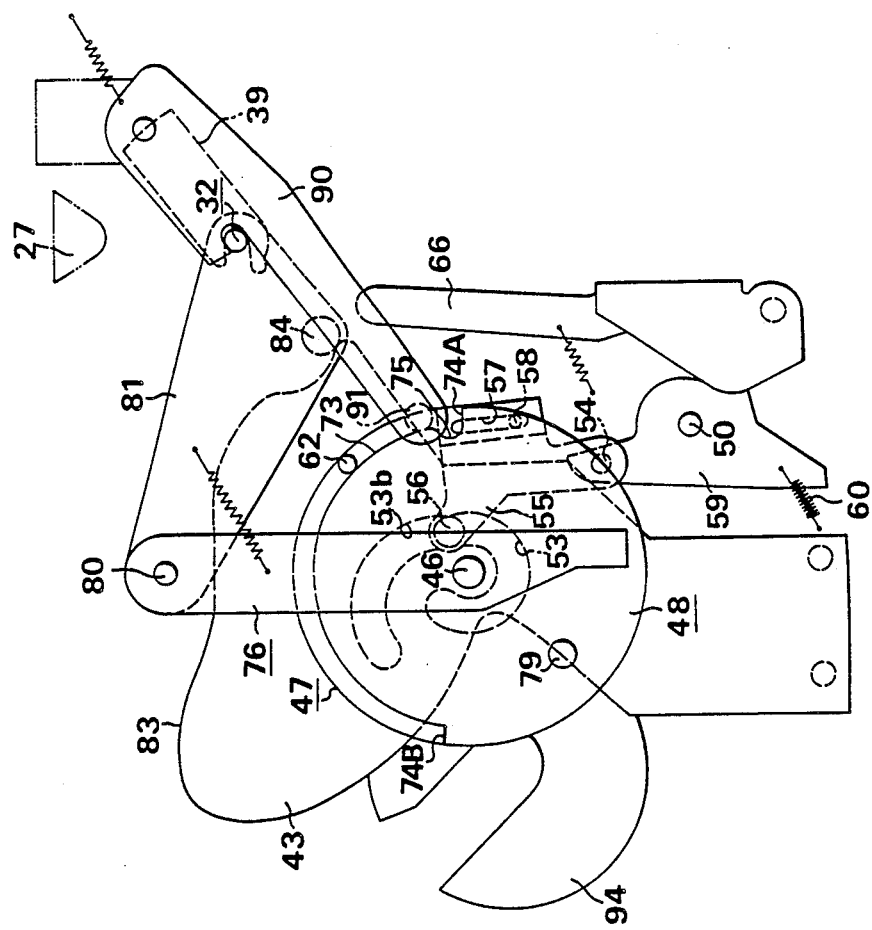
FIGS. 2A, B, C, D, E, F, G and H are top views used to explain the mode of operation of the tape drive shown in FIG. 1.

A first ejection intermediate lever 59 for ejecting the tape cartridge inserted into the housing 9 through the opening 10A to the exterior has its intermediate portion loosely fitted over the output shaft 50 so as to be rotatable independently of the output shaft. The first ejection intermediate lever 59 is biased in the clockwise direction in FIG. 1 under the force of a bias spring 60 shown in FIG. 2. One arm portion 61 of the first ejection intermediate lever 59 is extended toward the first disk 47 and is pressed again a pin 62 extended from the disk 47. As best shown in FIG. 2A, the first ejection intermediate lever 59 has an arcuate surface 63 merging the right-side surface of the arm portion 61 and a stepped portion 64 extended outwardly from the arcuate surface 63 at the right end thereof.

A supporting shaft 65 is extended upright from the base plate 1 adjacent to the first ejection intermediate lever 59 and one end of an ejection lever 66 is pivoted to the supporting shaft 65 so as to be rotatable about the supporting shaft 65 while the other end of the ejection lever 66 faces the interior of the housing 9 through an opening 10B thereof. The ejection lever 66 is biased in the counterclockwise direction in FIG. 1; that is, in the direction in which the ejection lever 66 is retracted away from the interior of the housing 9 under the force of a bias spring 67 shown in FIG. 2A. A second ejection intermediate lever 69 is rotatably pivoted with a pivot pin to the base portion of the ejection lever 66 and is based in the clockwise direction in FIG. 1 under the force of a bias spring 70 loaded between the second ejection intermediate lever 69 and the ejection lever 66 as shown in FIG. 2A. A pin 71 is extended from the leading end of the second ejection intermediate lever 69 and is pressed against the first ejection intermediate lever 59 by the biasing force of the spring 70. The base portion of the ejection lever 66 is in the form of a letter U and the pivot pin 68 has the upper and lower ends supported by the ejection lever 66 and sufficiently resist against the pushing force from the first ejection intermediate lever 59.

The second disk 48 fitted over the rotating shaft 46 has an arcuate cam surface 73 whose diameter is slightly smaller than the outer peripheral surface 72 of the second disk 48 and which is extended at an angle less than 180°. The both ends of the arcuate cam surface 73 are discontinued from the outer peripheral surface 72 by radially inwardly extended stepped portions 74A and 74B, respectively, and one stepped portion 74A is communicated with a recess 75 defined at the lower end of the cam surface 73.

A first driving arm 76 is fitted at the upper end portion of the rotating shaft 46 as to be rotatable independently of the rotating shaft 46 and is bent adjacent to the rotating shaft 46 so that the base portion 77 of the first driving arm 76 is located at a position lower than the position of the leading end portion 78 thereof. A pin 49 is extended upright from the upper surface of the second disk 48 to such a height at which the pin 79 engages with the base portion 77 of the first driving arm 76 but passes past below the leading end portion 78 of the first driving arm 76. The vertex of a second driving arm 81 which is substantially in the form of a triangle and located below the first driving arm 76 is pivotably fixed with a pivot pin 80 at the leading end of the first driving arm 76. A spring 82 (See FIG. 2A) is loaded between the first and second driving arms 76 and 81 so that they are moved toward each other. The second driving arm 81 is biased in the clockwise direction in FIG. 1. A pin 84 is extended upright from one of the remaining two vertexes of the triangular second driving arm 82 and is displaced along the cam surface 83 of the stationary cam 43. The holding pin 32 is extended from the other of the remaining vertexes of the triangular second driving arm 81 for engagement with the leader block 39 of the tape cartridge 14 and is extended through the second driving arm 81 both upwardly and downwardly. The holding pin 32 consists of a small-diameter shaft 85 whose lower end is connected through a conical shaped wedge surface 86 to a large-diameter holding portion 87 (which engages with the leader block 39). When the relative positions of the holding pin 32 and the leader block 39 in the vertical direction are determined to have a predetermined relative position relationship, the leader block 39 can freely made into contact with or removed away from the holding portion 87 of the holding pin 32 in the horizontal direction or the holding portion 87 of the holding pin 32 and the leader block 39 can be displaced in unison with each other in the horizontal direction. The leader block 39 of the type described above is well known in the art so that the further detailed explanation shall not made in this specification.

Figure 2C:
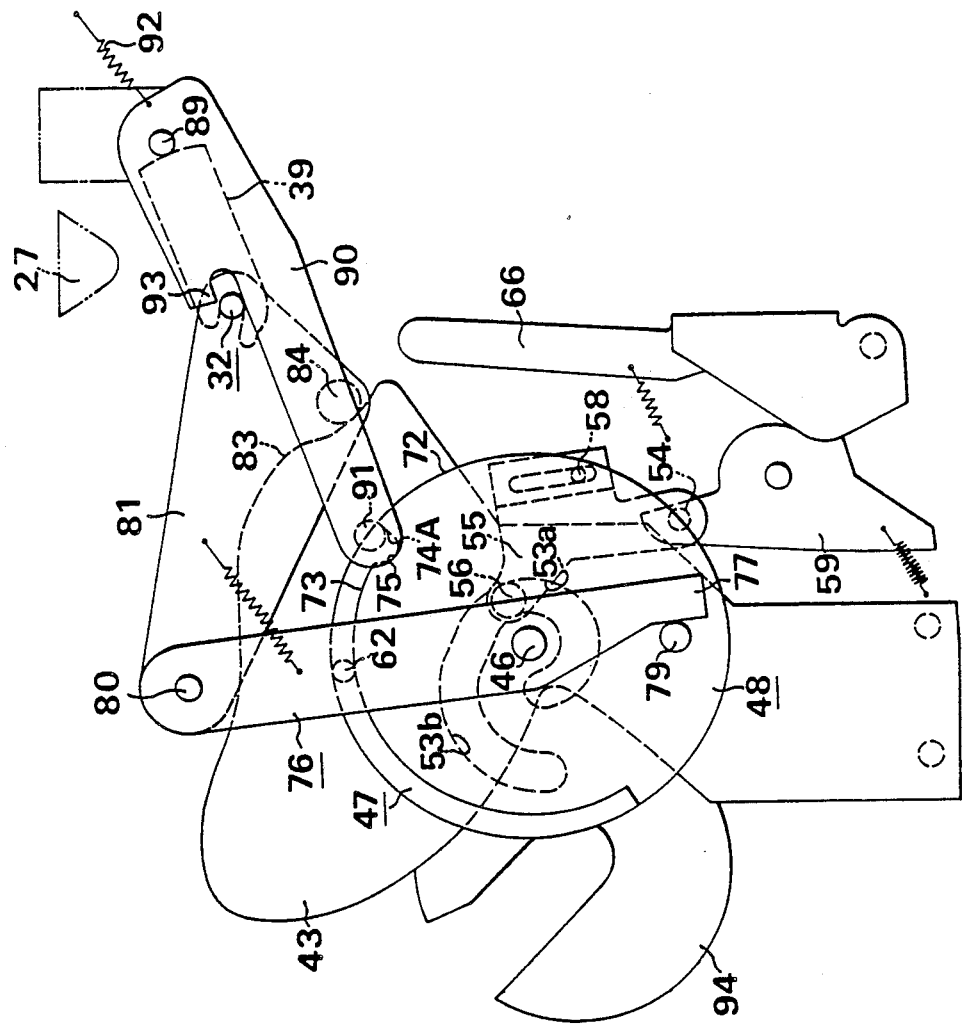
Figure 2:
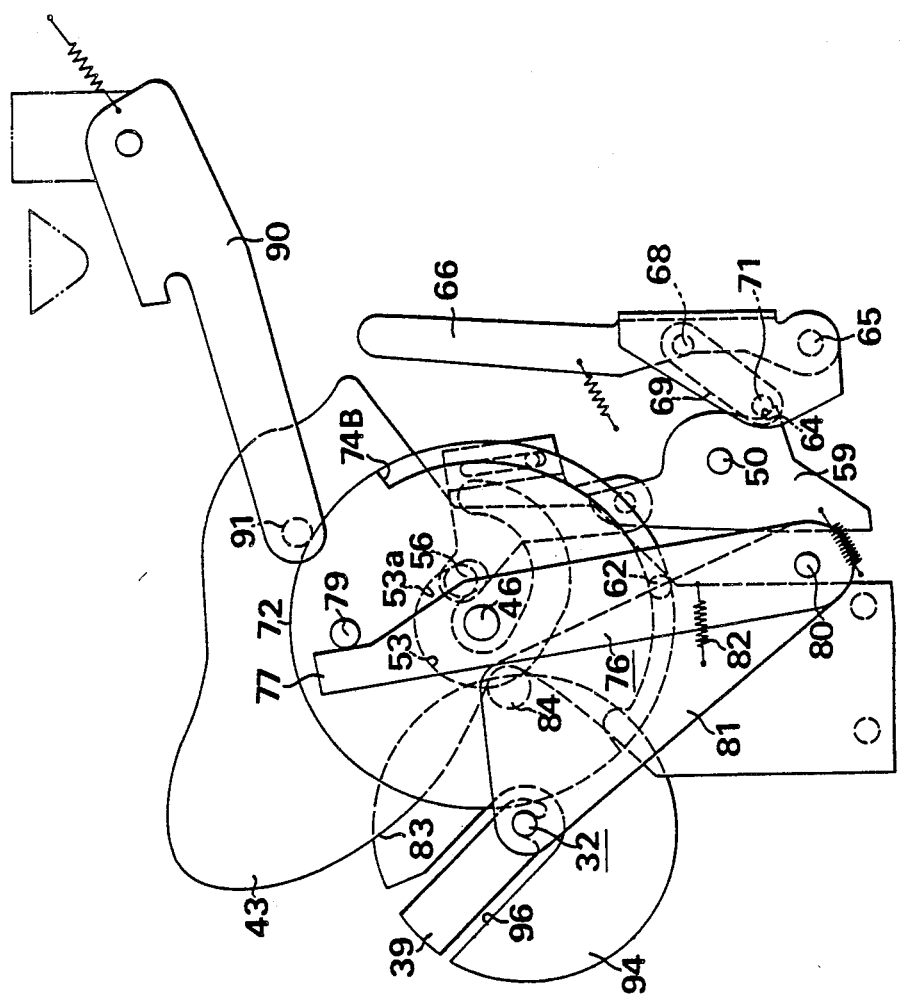
Figure 2F:
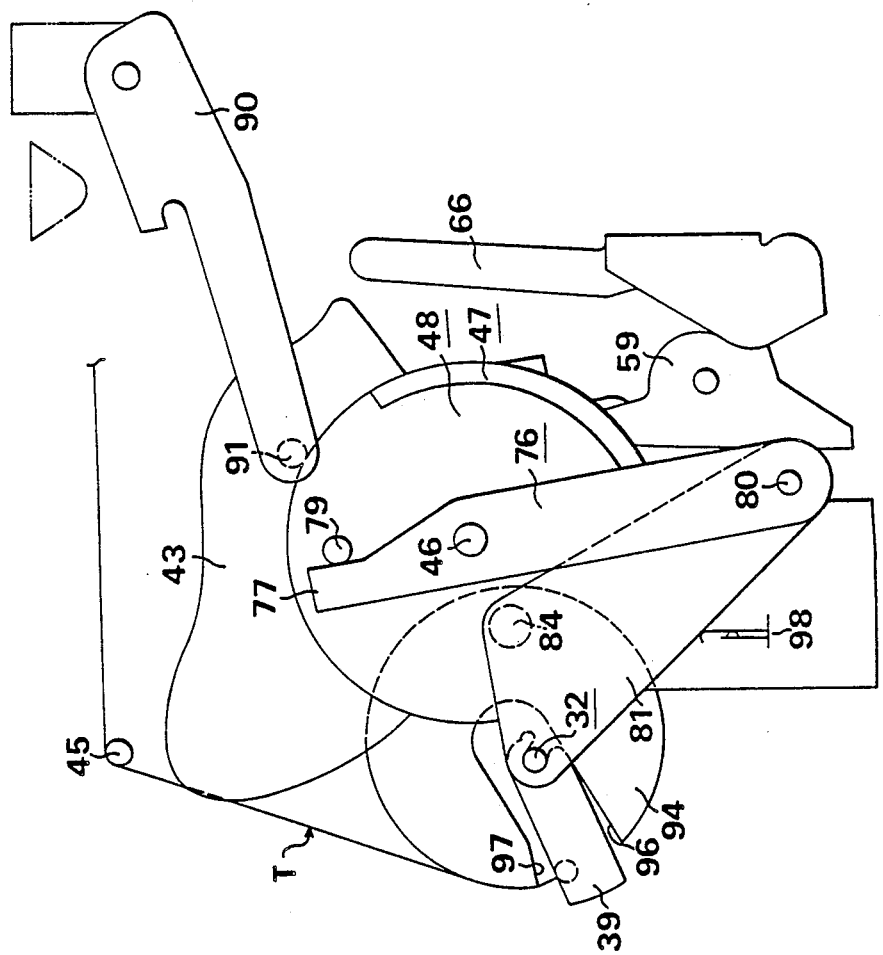

A bracket 88 is disposed on the base plate 1 in such a way that the horizontal portion thereof is in opposed relationship with the upper surface of the top plate 24 of the housing 9 at a position on the side of the opening 10A of the housing 9 slightly spaced apart from the cutout portion 26 and a driving lever 90 is pivotably fixed with a pivot pin 89 to the bracket 88. The driving lever 90 is located above the second driving arm 81 and its leading end is made into engagement with the cam surface 73 of the second disk 48 and has a downwardly extended pin 91 for engagement with the recess 75 thereof. The driving lever 90 is adapted to bias in the clockwise or counterclockwise direction in FIG. 1 depending upon its position under the force of a spring 92 which functions as a change spring shown in FIG. 2A. In the states as shown in FIGS. 2A and B, the driving lever 90 is biased in the clockwise direction while in the states shown in FIGS. 2C and D, it is biased in the counterclockwise direction. The driving lever 90 has a hook 93 (See FIG. 2A) which is formed at the central portion thereof and is adapted to engage the shaft portion 85 of the holding pin 32 downwardly extended from the second driving arm 81.

A take-up reel 94 for taking up the tape unrolled from the tape cartridge 14 is disposed at the position opposite to the housing 9 in the longitudinal direction of the base plate 1 in such a way that part of the take-up reel 94 is located below the stationary cam 43. The take-up reel 94 is driven by a motor 95 mounted on the lower surface of the base plate 1. The take-up reel 94 is formed with an insertion groove 96 which is adapted to received therein the leader block 39 and is radially extended from the outer periphery of the take-up reel 94 beyond the center thereof. When the leader block 39 is inserted into the insertion groove 96 of the take-up reel 94, the holding pin 32 holding the leader block 39 is located at the center of the take-up reel 94. Therefore, even when the take-up reel 94 is rotated by the motor 95 with the leader block 39 kept inserted into the insertion block 96, the displacement of the holding pin 32 in unison with the rotation of the leader block 39 is prevented so that the driving arm 81 and the first driving arm 76 holding the stationary reel 94 in a stationary state. An inclined guide surface 97 is defined at one side edge of the insertion groove 96 adjacent to and continuous with the outer periphery of the take-up reel 94 so that the insertion or removal of the leader block 96 into or out of the insertion groove 96 is facilitated. The sliding guide surface 97 of the take-up reel 94 is maintained at a predetermined position in response to the output signal from a sensor (not shown).

The cam surface 83 of the stationary cam 43 along which slides the pin 84 of the second driving arm 81 has a special cam profile so that when the second driving arm 81 follows the rotation of the first driving arm 76 caused when the pin 79 of the second disk 48 pushes the first driving arm 76, the leader block 39 held by the holding pin 32 passes past the exterior of the magnetic head 44 and then is inserted into the insertion groove 96 of the take-up reel 94 located at a predetermined position as described above.

A switch 98 as shown in FIG. 2E is disposed at a position adjacent to the final limit end of the displacement of the second driving arm 81 which follows the first driving arm 76 which is pushed by the pin 79 of the second disk 48 and consequently is rotated in the counterclockwise direction as described in more detail below, The switch 98 is adapted to be pushed by the second driving arm 81 and closed when the second driving arm 81 is slightly moved away from its final limit end of its displacement.

Next the mode of operation with the above-described construction will be described in detail below.

First, FIG. 2A shows the initial state in which the tape cartridge 14 is not loaded or inserted into the housing 9 shown in FIG. 1. In this state, the pin 56 of the lever 55 for causing the displacement of the housing driving plate 2 is located at the end of the driving groove 53b of the cam groove 53 of the first disk 47. The arm portion 61 of the first ejection intermediate lever 59 is pushed by the pin 62 of the first disk 47 so that the first ejection intermediate lever 59 is forced to rotate in the counterclockwise direction against the spring 60 from its free state so that the pin 71 of the second ejection intermediate lever 69 is located at a position at which the pin 71 is made into contact with the rear portion of the stepped portion 64 of the first ejection intermediate lever 59. Therefore, the ejection lever 66 is forced to be retracted away from the housing 9 under the force of the spring 67. The pin 91 at the leading end of the driving lever 90 is made into contact with the cam surface 73 adjacent to the stepped portion 74B of the second disk 48 under the force of the spring 92. In this case, the hook 93 of the driving lever 90 is engaged with the shaft 85 of the holding pin 32 (only the shaft 85 of the pin 2 is shown for the sake of simplification of illustration in FIGS. 2A–H) facing the receiving portion 33 of the housing 9. The pin 79 of the second disk 48 which is adapted to engage with the base end portion of the first driving arm 76 is located at a position almost angularly spaced apart from the base portion 77 by 180°.

In order to record or read out the information onto or off of the tape loaded in the tape cartridge by tape drive under these conditions, first a start button (not shown) is depressed. Then the motor 49 is energized so that it output shaft 50 causes the rotation in the clockwise direction of the spur gear 51 and consequently the spur gear 52 in mesh with the spur gear 51 is forced to rotate in the counterclockwise direction. As a result, the rotating shaft 46 which carries the spur gear 52 is caused to rotate also in the counterclockwise direction so that the first and second disks 47 and 48 integral with the rotating shaft 46 are also rotated in the counterclockwise direction. In this case, in response to the rotation in the counterclockwise direction of the first disk 47, the first ejection intermediate lever 59 which is in engagement with the pin 62 is forced to rotate in the clockwise direction under the force of the spring 60. Furthermore, the pin 56 of the lever 55 is displaced through the spiral driving groove 53b toward the center portion of the first disk 47 so that the lever 55 is rotated in the counterclockwise direction and consequently the housing driving plate 2 is displaced in the left direction in FIG. 1. However, at the initial position of the housing driving plate 2, as best shown in FIG. 3A, each pin 12 of the housing 9 which is fitted into the guide groove 5 of each guide plate 4 is located at the outer end of the horizontal groove 5a at the upper end of the guide groove 5 and moreover the pin 23 of the lever 20 having the hook at the leading end thereof engaged with arm 18 of the door 16 is in contact with the left inclined portion 8b of the mountain-shaped cam 8, so that when the housing driving plate 2 starts displacing in the left direction in FIG. 3A, the pin 23 immediately rides over the top portion 82 of the cam 8 while the lever 20 is rotated in the counterclockwise direction. As a result, the lever 20 forces the door 16 to rotate in the clockwise direction against the spring 17, thereby opens the opening 10A of the housing 9. During the stroke of the housing driving plate 2 in order to rotate the door 16 in the manner described above, each pin 12 extending from the housing 9 is displaced within the guide groove 5 of the guide plate 4 extended from the housing driving plate 2, but the displacement of the pin 12 in the guide groove 5 is limited within the horizontal groove 5a thereof so that the housing 9 is maintained at its initial height.

The angle of rotation of the motor 49 from the time when the door 16 starts its rotation to the time when it open the opening 10A of the housing 9 is measured by a counter (not shown) so that the motor 49 is temporarily de-energized in the state as shown in FIG. 3B.

When the cartridge 14 is loaded or inserted through the opening 10A thus opened into the housing 9 in such a way that the leader block 39 is located at the front position, the leader block 39 is engaged with the holding pin (shaft portion 85) of the second driving arm 81 so that the cartridge 14 is stopped. In this case, the cartridge 14 is completely inserted or loaded into the housing 9 so that the gear 40 of the tape cartridge 14 is in mesh with the gear 36 of the motor 35. Whether or not the tape cartridge 14 is completely inserted into the housing 9 is detected by a limit switch or the like (not shown) and upon the detection of the complete insertion of the tape cartridge 14, the motor 49 is energized again to rotate in the same direction.

When the motor 49 is energized again in the manner described above, the pin 56 is forcibly displaced along the driving groove 53b of the cam groove 53 of the first disk 47 so that the lever 55 is further rotated in the counterclockwise direction and consequently the housing driving plate 2 is further displaced in the left direction in FIG. 1. Therefore, as shown in FIG. 3C, the pin 23 of the lever 20 passes the top portion 8a of the cam 8 and then is made into contact with the right inclined portion 8b thereof so that the door 16 closes the opening 10A of the housing 9 under the force of the spring 17. Meanwhile, each pin 12 of the housing 9 moves downwardly along the inclined groove 5b of each guide plate 4 so that the housing 9 is lowered accordingly. When the pin 56 reaches the inner end of the driving groove 53b, each pin 12 reaches the lowermost end of the inclined groove 5b of each guide plate so that the step for lowering the housing 9 is completed. In this case, the gear 40 of the tape cartridge 14 is in mesh with the gear 36 facing to the interior of the housing 9 and the leader block 39 of the tape cartridge 14 is made into engagement with the holding portion 87 of the holding pin 32, whereby the leader block 39 and the holding pin 32 are interconnected with each other. As a result, the holding pin 32 and the leader block 39 can be displaced in the horizontal direction in unison. The above-described conditions are shown in FIG. 2B and because of the rotation of the motor 49, the pin 91 at the leading end of the driving lever 90 is brought to a position very close the recess 75 formed in the cam surface 73 of the second disk 48 for receiving therein the pin 91.

When the motor 49 is kept energized under these conditions, both the disks 47 and 48 are rotated in the counterclockwise direction so that the pin 91 of the driving lever 90 which is in contact with the cam surface 73 of the second disk 48 drops into the recess 75 formed in the cam surface 73. In this case, the first disk 47 is kept rotated, but the pin 56 fitted into the cam groove 53 of the first disk 47 is only displaced along the escape groove 53a of the arcuate cam groove 13 so that the lever 55 is maintained in the state as shown in FIG. 2B. When the second disk 48 is further rotated in the counterclockwise direction after the pin 91 has dropped into the recess 75, the driving lever 90 is caused to rotate in the clockwise direction about the pivot pin 89 while the pin 91 is kept fitted into the recess 75 so that the leader block 39 relatively tightly fitted into the housing 9 is separated and withdrawn from the housing by a strong force produced based on "the principle of a lever."

Thereafter, when the motor 49 continues to drive, the second disk 48 is caused to rotate in the counterclockwise direction in unison with the first disk 47, the pin 79 of the second disk 48 is made into engagement with the base end portion 77 of the first driving arm 76 so that the arm 76 is forced to rotate in the counterclockwise direction. Then, the second driving arm 81 which is pivoted to the first driving arm 76 is displaced in such a way that the pin 84 of the arm 81 is maintained in contact with the cam surface 83 of the stationary cam 43. As a result, the holding pin 32 (the shaft portion 85) is drawn out of the hook 93 of the driving lever 90 so that the engagement with the driving lever 90 is released. Therefore, when the firs driving arm 76 is rotated in the counterclockwise direction, the leader block 39 and the holding pin 32 are displaced along the locus defined by the cam surface 83 of the stationary cam 43 so that the tape connected to the leader block 39 is withdrawn out of the tape cartridge 14 and is transported in contact with the magnetic head 44 and the guide pins 45. On the other hand, the driving lever 90 is disengaged from the holding pin 32 and as the rotation of the second disk 48 continues, the pin 91 of the driving lever 90 is drawn out of the recess 75 of the second disk 48 and then is made into contact with the outer peripheral surface 72 of the second disk 48, thereby the driving lever is maintained in the free state.

Meanwhile, the take-up reel 94 which is maintained in the ready state is so controlled that, as best shown in FIG. 2D, the insertion groove 96 of the take-up reel 94 is maintained substantially in parallel with the cam surface 83 of the stationary cam 43 adjacent to the insertion groove in the longitudinal direction of the groove 96 in order to permit the simple insertion of the leader block 39 into the insertion groove 96. When the first and second disks 47 and 48 are rotated in the counterclockwise direction so that the pin 56 of the lever 55 reaches almost at the end of the escape groove 53a of the first disk 47, the second driving arm 81 is caused to follow the rotation of the first driving arm 76 and the pin 84 is displaced along the cam surface 83 of the stationary cam 43 so that the holding pin 32 causes the leader block 39 to be completely inserted into the insertion groove 96 of the take-up reel 94. Then, a limit switch (not shown) detects the relative positions between the cam groove 53 and the pin 56 or the complete insertion of the leader block 39 into the insertion groove 96 of the take-up reel 94 and in response to the output signal from this limit switch, the motor 49 is de-energized. In the case of withdrawing the tape out of the supply reel 38, the driving of the motor 35 is so controlled as to be decreased in response to the tape withdrawing or unrolling velocity determined by the motor 49 and as to rotate in synchronism with the tape withdrawing or unrolling velocity, thereby imparting a suitable degree of tension to the tape to prevent it from being slackened.

In the case of recording or reproduction through the magnetic head 44 under these conditions, a button (not shown) is depressed so that the motor 95 for rotating the take-up reel 94 and the motor 35 for driving the supply reel 38 housed within the tape cartridge 14 so that the tape unrolled from the supply reel 38 is withdrawn from the tape cartridge 14 and is made into contact with the magnetic tape. In this case, the rotational speeds of the both motors 95 and 35 are so controlled that a speed at which the tape is unrolled from the supply reel 38 becomes slightly slower than a speed at which the tape is taken up by the take-up reel 94 so that the tape is always transported under tension As a result, the safety of the tape transportation is ensured and the recording or reproduction through the magnetic head 44 can be made with a high degree of accuracy.

When the tape stored on the supply reel 38 is all taken up the take-up reel 94, both the motors 35 and 95 are reversed in direction automatically or in response to the depression of a reverse button (not shown) so that the tape on the take-up reel is rewound around the supply reel 38. In this case, both the motors 35 and 95 are so controlled that a speed at which the tape is unrolled from the take-up reel 94 also becomes slower than a speed at which the tape is taken up by the supply reel 38. It should be noted even when the tape is reversed in direction from the take-up reel 94 to the supply reel 38, the recording or reproduction through the magnetic head is also possible.

And when almost of all the tape is rewound around the supply reel 38, as best shown in FIG. 2E, the tape T one end of which is connected to one end of the leader block 38 inserted in the insertion groove 96 of the take-up reel 94 is extended toward the tape cartridge 14 under tension. In this case, the selection switch which is disposed adjacent to the holding pin 31 of the second driving arm 81 has not yet been closed. Thereafter, when both the supply and take-up reels 38 and 94 are rotated in the same direction through a small angle, the leader block 39 connected to the one end of the tape T is slightly drawn out of the insertion groove 96 because the tensile force is imparted to the tape T. Then, since the leader block 39 is connected to the holding pin 32 of the second driving arm 81, in response to the displacement of the leader block 39, the second driving arm 81 is caused to rotate about the pivot pin 30 in the counterclockwise direction so that the selection switch 98 is closed.

When the selection switch 98 is closed in the manner described above, the motor 94 for driving the take-up reel continues to drive until the take-up reel 94 is brought to the position shown in FIG. 2D and then is de-energized. On the other hand, the motor 35 for driving the supply reel 38 continues to drive, thereby imparting the tensile force or tension to the tape T which is being transported. The motor 49 for driving the first and second disks 47 and 48 are reversed in direction. Then the both the first and second disks 47 and 48 are rotated in the clockwise direction so that the pin 79 of the second disk 48 is rotated in the direction in which the pin 79 is moved away from the base end portion 77 of the first driving arm 76, but the supply-reel drive motor 35 continues to drive at a decreased velocity in the direction in which the tape T is take up by the supply reel 38. Therefore, when the first driving arm 76 is released from the pin 79, the tape T pulls the leader block 39 so that after the leader block 39 has been withdrawn out of the insertion groove 96 of the take-up reel 94, the second driving arm 81 connected to the leader block 39 through the holding pin 32 and the first driving arm 76 which is connected to the second driving arm 81 through the pivot pin 80 and the spring 82 are caused to rotate in the direction in which the pin 81 of the second driving arm 81 slides along the cam surface 83 while the tape T is taken by the supply reel 38; that is, in the direction in which the first driving arm 76 is forced to rotate in the clockwise direction. Under these conditions, the pin 71 of the second ejection intermediate lever 69 is brought to a position at which the pin 71 is almost made into engagement with the stepped portion 64 of the first ejection intermediate lever 59.

When the tape T is being taken up by the supply reel 38 in the tape cartridge 14 in the manner described above, as shown in FIG. 2C, the holding pin 38 (the shaft portion 85) is brought to a position at which the pin 32 can engage with the hook 93 of the driving lever 90 and the leader block 39 is pulled by the tape T and guided by the guide post 27 so that the leader block 39 is partially inserted into the tape cartridge 14. Next when the pin 56 of the lever 55 is brought to the position at which the escape groove 53a of the first disk 47 merges with the driving groove 53b, the holding pin 32 is made into complete engagement with the hook 93 of the driving lever 90 so that the leader block 39 is completely retracted into the tape cartridge 14. In this case, the pin 91 at the leading end of the driving lever 90 is temporarily made into engagement with the recess 75 of the second disk 48. Therefore, upon rotation of the second disk 48, the force required for retracting the leader block 39 into the tape cartridge 14 is transmitted through the holding pin 32 in engagement with the hook 93 of the driving lever 90. The state of the leader block 39 completely retracted into the tape cartridge 14 is detected by a limit switch (not shown) so that the supply-reel drive motor 35 is de-energized.

Thereafter the motor 49 still continues to drive so that in response to the rotation in the clockwise direction of the first disk 47, the pin 56 of the lever 55 is caused to be displaced in the driving groove 53b of the first disk 47 so that the lever 55 is forced to rotate in the clockwise direction and consequently the housing driving plate 2 is displaced to in the right direction in FIG. 1. As a result, each pin 12 of the housing 9 is caused to move upwardly along the inclined groove 5b of each guide plate 4 so that the housing 9 is raised and consequently the gears 40 and 36 are disengaged from each other. When each pin 12 of the housing 9 reaches the uppermost end of the inclined groove 5b as best shown in FIG. 3B, the lift of the housing 9 is stopped. In this case, the pin 23 of the lever 20 is located at the top portion 8a of the cam 8 so that lever 20 causes the door 16 in the clockwise direction and consequently the opening 10A of the housing 9 is opened.

Figure 2G:
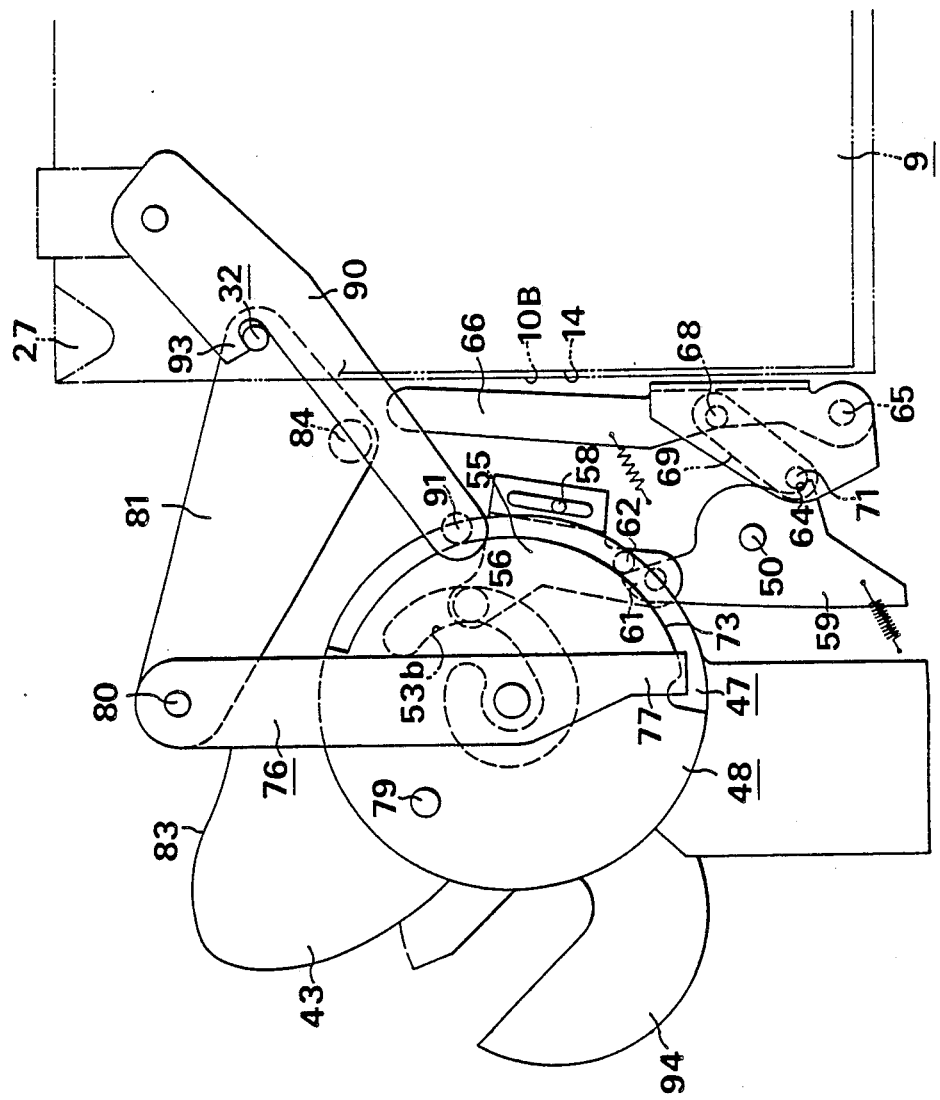
Figure 2H:
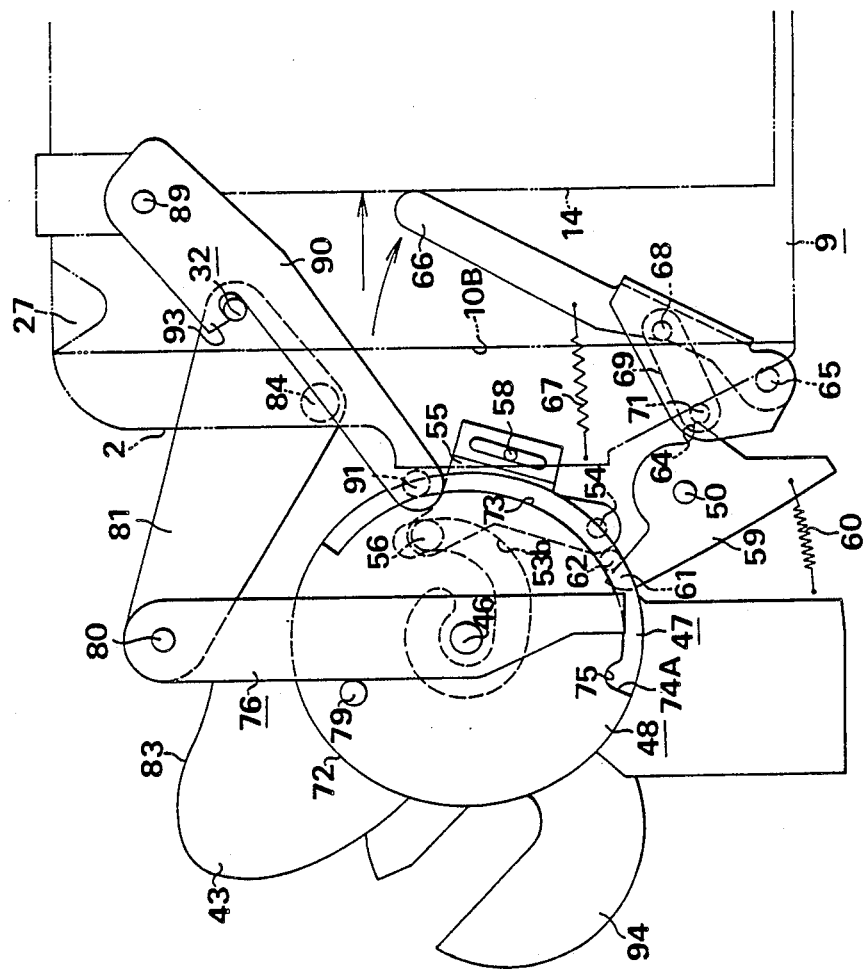

When the housing 9 is raised to its uppermost position, as best shown in FIG. 2G, the pin extended from the first disk 47 is made into engagement with the arm portion 61 of the first ejection intermediate lever 59 and when the first disk 47 is further rotated in the clockwise direction, the pin 62 pushes the first ejection intermediate lever 59 so that the latter is caused to rotate in the counterclockwise direction. Then, since the pin 71 of the second ejection intermediate lever 69 is made in engagement with the stepped portion 64 of the first ejection intermediate lever 59, when the first ejection intermediate lever 59 is rotated in the counterclockwise direction, the second ejection intermediate lever 69 is displaced substantially in the longitudinal direction thereof and consequently the ejection lever 66 is forced to rotate in the clockwise direction against the spring 67. As a consequence, the tape cartridge 14 in the housing 9 maintained at its uppermost position is pushed by the ejection lever 66 and is ejected through the opening 10A which is opened, out of the housing 9 to the exterior. Thereafter the pin 62 of the first disk 47 continues to push the first ejection intermediate lever 59, the pin 71 of the second ejection intermediate lever 69 is released from the stepped portion 64 of the first ejection intermediate lever 59 and is brought to the position behind the stepped portion 64 so as to be in the free state. Therefore, the ejection lever is caused to rotate in the counterclockwise direction under the force of the bias spring 67 to return to its retracted position. While the ejection lever 66 is activated in the manner described above, the pin 56 of the lever 55 is displaced along the driving groove 53b of the cam groove 53 of the first disk 47, but in the case of the displacement in the right direction of the housing driving plate 2, each pin 12 of the housing 9 is displaced through the horizontal groove 5a of the guide disk 4 so that there is no fear at all that the housing 9 is forced to further rise beyond its uppermost position. Meanwhile, due to the displacement in the right direction of the housing driving plate 2, the pin 23 of the lever 20 drops from the top portion 8a of the cam 8 and is brought to a position at which the pin 23 is made in contact with the left inclined cam profile portion 8b. Therefore, when the tape cartridge 14 is removed out of the housing 9 manually, the door 16 is rotated in the counterclockwise direction under the force of the spring 17 to close the opening 10A of the housing 9. Thus the tape drive is returned to its initial state described above.

According to the embodiment described above, only one reversible motor 49 is provided as a driving source for automatically accomplishing the opening or closing of the door 16, the vertical movement of the housing 9, the displacement of the leader block 39 and the ejection of the tape cartridge 14 out of the housing 9 by the ejection lever 66 so that the tape drive in accordance with the present invention can be made simple in construction and compact in size. Furthermore, various limit switches are used to control the operation so that no erratic operation occurs and the stable function can be ensured. Moreover, the transportation of the tape T is applied with brake by either of the motor 35 or the motor 95 so that the tape T can be always maintained under tension and consequently the stable transportation of the tape T and the position recording or reproduction of information can be ensured.

So far it has been described that under the condition that the pin 71 of the second ejection intermediate lever 69 is maintained in engagement with the stepped portion 64 of the first ejection intermediate lever 59, the first ejection intermediate lever 59 is forced to rotate in the counterclockwise direction so that the ejection lever 66 is rotated in the clockwise direction, thereby pushing the tape cartridge 14 in the housing 9, but since the lever 5 and the housing driving plate 2 which is caused to reciprocate in response to the rotation of the lever 55 are activated in response to the rotation of the first disk 47 as in the case of the first ejection intermediate lever 59, it is possible to combine the function of the first ejection intermediate lever 59 with that of the lever 55 or the housing driving plate 2 so that the ejection lever 66 is rotated by the lever 55 or the housing driving plate 2.

What is claimed is:
1. A tape drive within an openable housing for receiving a magnetic tape cartridge having a magnetic tape therewithin, said tape having a leader block at one end of said tape, comprising:
 a. a motor for providing rotary motion via an output shaft of said motor;
 b. means, operative responsively to rotation of said output shaft, for
  i. opening said housing for insertion of said cartridge thereinto and thereafter closing said housing responsively to further rotation of said output shaft after said cartridge has been inserted into said housing;
 c. means, operative responsively to rotation of said output shaft, for moving said housing, with said cartridge therewithin, from a cartridge insertion/ejection position into a tape withdrawal/rewind position at which a reel within said cartridge is drivingly engaged by a second motor and a leader block at one end of said tape is pivotally engaged by a lever means, for selective withdrawal of said tape from said cartridge and rewind of said tape thereinto; and moving said housing and said cartridge therewithin from said tape withdrawal/rewind position to said cartridge insertion/ejection position after said tape has been rewound into said cartridge opening said housing;

d. means, operative responsively to rotation of said output shaft, for said lever means operating responsively to said output shaft rotation for pivotally engaging and thereafter moving said leader block and said tape attached thereto, when said housing and cartridge are at said tape withdrawal/rewind position, along a preselected path passing adjacent a tape read/write head to a position at which said leader block engages a take up reel for winding of said tape thereon upon rotation of said take up reel, said lever means pivotally engaging said leader block while said tape is wound onto or off of said take-up reel;

e. cam means for guiding said lever means in a manner that said leader block and said tape attached thereto move along said preselected path;

f. means, operative responsively to rotation of said output shaft in a direction opposite to said first direction, for ejecting said cartridge from said housing after said housing moving means has moved said housing and said cartridge therewithin from said tape withdrawal/rewind position to said cartridge insertion/ejection position and has opened said housing.

2. The tape drive of claim 1 wherein said lever means further comprises:
   a. a circular disk fixedly rotating with said motor shaft;
   b. a first lever member riding on said circular disk, slidingly engaging said motor shaft to be rotatable about said shaft independently of shaft rotation, said first lever member having one portion of length extending from said position of engagement with said motor shaft a distance exceeding diameter of said circular disk;
   c. a second lever member of generally triangular configuration;
   d. first spring means for biasing said first and second levers to rotate towards one another about a pivotal connection therebetween;
      i. said second lever being pivotally connected to said first lever at one vertex of said triangular-shaped second lever;
      ii. said second lever having a first pin, extending towards said cam means proximate one remaining vertex of said triangular shape, for following a surface of said cam means defining said predetermined path, upon movement of said second lever responsively to rotation of said first lever;
      iii. said second lever including means for engaging an end of said magnetic tape to withdraw said tape from said cartridge upon rotation of said output shaft and consequent movement of said first and second levers.

3. The tape drive of claim 1 wherein said cam means is stationary.

* * * * *